BACKHITCHING TAPE CONTROL

Filed Dec. 24, 1962 4 Sheets-Sheet 1

TAPE CONTROL UNIT

INVENTORS
EARL W. MILLER
JOHN W. IRWIN

BY Bernard M. Goldman
ATTORNEY

Sept. 20, 1966 E. W. MILLER ET AL 3,274,574

BACKHITCHING TAPE CONTROL

Filed Dec. 24, 1962 4 Sheets-Sheet 2

Sept. 20, 1966 E. W. MILLER ET AL 3,274,574

BACKHITCHING TAPE CONTROL

Filed Dec. 24, 1962 4 Sheets-Sheet 3

3,274,574
Patented Sept. 20, 1966

3,274,574

BACKHITCHING TAPE CONTROL

Earl W. Miller, Poughkeepsie, and John W. Irwin, Wappingers Falls, N.Y., assignors to International Business Machines Corporation, New York, N.Y., a corporation of New York Filed Dec. 24, 1962, Ser. No. 246,813
12 Claims. (Cl. 340—174.1)

This invention relates to means for precisely controlling tape operations where the effective head position on tape is shifted ("jumped") by switching between different head gaps in a respective track.

A "jump" in the effective position of the tape with respect to the head occurs without tape movement when the head function changes from one head to another in the same track. Separate read and write head gaps are commonly used in digital tape transports, wherein the read-head gap is positioned a small fraction of an inch from the write-head gap in the same track. Separate read and write head gaps in each track permit the read head to monitor data immediately after it is recorded so that system time is not lost by requiring a backspace and reread, which must be done with a single read/write head. The read and write head gaps should be as closely spaced as possible, but they cannot be spaced less than a minimum amount to prevent the read head gap from picking up a significant amount of flux from the write head while the read head is monitoring a write operation. Furthermore, an erase-head gap also may be used, which provides a third head gap generally positioned ahead of the write gap by a significant amount so that erase head flux can erase the tape ahead of the writing gap; but they must be spaced far enough apart so that the erase flux does not obliterate information being written by the write-head gap. Thus the read-head gap will follow behind the write head gap, which may follow behind an erase head gap. The spacing between any two adjacent gaps in the same track might be ⅙ to ⅐ of an inch.

Thus if tape is being read by the read-head gap, and suddenly the writing operation is switched ON, the head function shifts from the read gap to the write gap (and erase gap) so that there is an effective jump in the head function to a different place on the tape at the instant of switching by the amount of spacing between the heads. Where write and read gaps only are used, the jump in effective head position will be an amount equal to the spacing between the read and write gaps. On the other hand, if read, write and erase gaps are used, the jump in effective head position will be an amount equal to the spacing between the read and erase head gaps.

This effective jump in head position is found whenever a shift in head function occurs. Generally the most important shift is where the head position jumps in the direction of tape movement which is found when the head function changes from a read only function to a write function (with or without read check) while tape is moving in a forward direction. This can result from a common situation where a block of data being written is found to have an error by the simultaneous read check. Consequently, the block must be rewritten. In such case, it is necessary to backspace the tape to the beginning of the block before rewritting can start. The backspace terminates when the beginning of the faulty block is sensed. Prior systems stopped and reversed the tape when the head was in the interblock gap (often called interrecord gap) preceding the erroneous block. In such prior systems, the large interblock gap (compared to the spacing between read and write gaps, and start and stop distance) assured that all head gaps would be within the interblock gap at the end of a backspace over a block. However, in present systems which require a very short interblock gap and very short stop distance in relation to the spacing between head gaps, there is no assurance that the erase head gap and write head gap are in the interblock gap; even though the read head gap must be in the interblock gap when the tape has stopped after a backspace operation. If writing were to start under these conditions there would be a possibility that the initial part of the erroneous block might not be erased or rewritten. This invention insures that the prior part of the faulty block must be erased and rewritten.

It is therefore the principal object of this invention to properly control tape operation when there is an effective jump in the position of the utilized head gap with respect to the tape due to changing from one head gap function to another.

It is another object of this invention to precisely control tape operation during a shift from read to write function for different head gaps in a given track.

It is a further object of this invention to precisely control the size of an interblock gap where an effective jump in head position with respect to the tape may be involved in the generation of the interblock gap due to a shift from read to write functions.

This invention provides a system for controlling the movement of recording tape to prevent the effect of a shift in effective head gap position due to switching the system operation from one head gap to another in the same track. A first status indicating means indicates when a particular status is assigned to the operation of one head gap. A second status indicating means when a particular status is assigned to the operation of the other head gap. Signaling means is used to signal when one of said status indicating means is brought up during the existence of an indication by the other status indicating means. A tape drive is caused to respond to the signaling means by driving the tape in a direction opposite to the direction of jump between said heads when said shift of operation takes place. Also direction reversing means is provided to change the direction of tape movement after a period of movement in the opposite direction. Finally the jump is permitted between the head gaps after the reversing movement has taken place.

A particular application of this invention includes means for recognizing the occurrence of a write command for a tape drive while the tape drive is in read status. Upon such recognition, the tape is controlled to move in a backward direction until the end of a prior data block is sensed, or until a predetermined time or distance occurs of a prior data block is not sensed. After sensing the end of the prior block (or the expiration of a distance or time without recognition of any prior block), the tape movement is reversed with the head within the body of the prior record (where there is a prior record). After the reversal, the tape is accelerated in the forward direction. After the tape has accelerated to approximately normal speed, the end of the prior block is sensed, and a write delay is started. The write delay controls the size of an interblock gap by holding up the writing of the next block until the tape has moved at normal speed for a precise amount of time measured by the write delay. Hence the generated interblock gap is precisely measured from the end of the prior block. Also when the end of the prior block is sensed, the erase head (if there is one) is actuated so that the entire following block is erased prior to being rewritten. After the write delay expires, the writing operation starts and the next block is thereby written.

The rewriting itself will erase any matter on which it is superimposed, but possible lateral track misalignment may prevent erasure by not superimposing the rewritten data. A prior wide erase gap across the entire tape assures total erasure under all misalignment conditions.

The foregoing and other objects, features and advantages of the invention will be apparent from the following more particular description of the preferred embodiment of the invention, as illustrated in the accompanying drawings.

In the drawings:

FIGURES 1 and 2 together represent an embodiment of the invention.

FIGURES 6A through H represent various positions for head gaps relative to tape during an operation of the invention.

Figure 3:
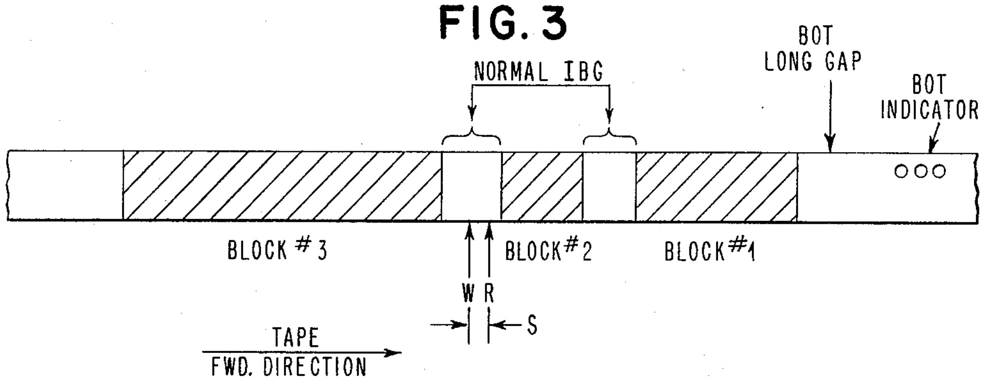
FIGURES 3 and 4 illustrate the relationship between interblock gaps and the spacing between read, write and erase head gaps.
Figure 4:
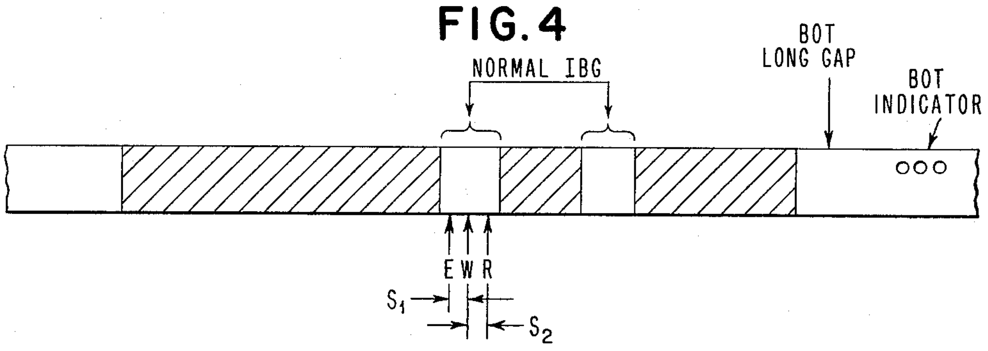

FIGURES 3 and 4 illustrate a section of magnetic tape having three information blocks recorded thereon. The data blocks are spaced apart by normal interblock gaps (IBG). A beginning of tape (BOT) indicator is shown as comprised of a series of three holes, which may be any type of indicator such as a reflective marker, etc. The first data block is spaced from the BOT indicator by a "long gap," which is larger than the normal IBG.

In FIGURE 3, the spacing S between a write-head gap (W) and a read-head gap (R) relative to the length of the IBG is illustrated in FIGURE 3 and the spacing is assumed greater than one-quarter of the IBG length between blocks. FIGURE 4 illustrates a three gap head arrangement, instead of the two gap head arrangement of FIGURE 3. Thus in FIGURE 4 the erase-head gap (E) is followed by the write-head gap (W), which is followed by the read-head gap (R). The spacing $S_1$ is between the erase and write head gaps, and the spacing $S_2$ is between the write and read head gaps. For example, in FIGURE 3, gap S may be 0.25 inch while the IBG may be 0.50 inch; and in FIGURE 4, $S_1$ and $S_2$ may each be 0.15 inch providing a spacing of 0.30 inch between the erase-head gap and read-head gap respectively.

In the case of FIGURE 3 where there is no erase head, the write head performs the erase function when rewriting.

In FIGURE 3, for example, if only the read head is operating, and then write head operation is started, there will be a jump in the effective position of the head relative to the tape by a distance S, which may have undesirable results that can be avoided by the backhitching feature which is the subject of the present invention.

Figure 5:
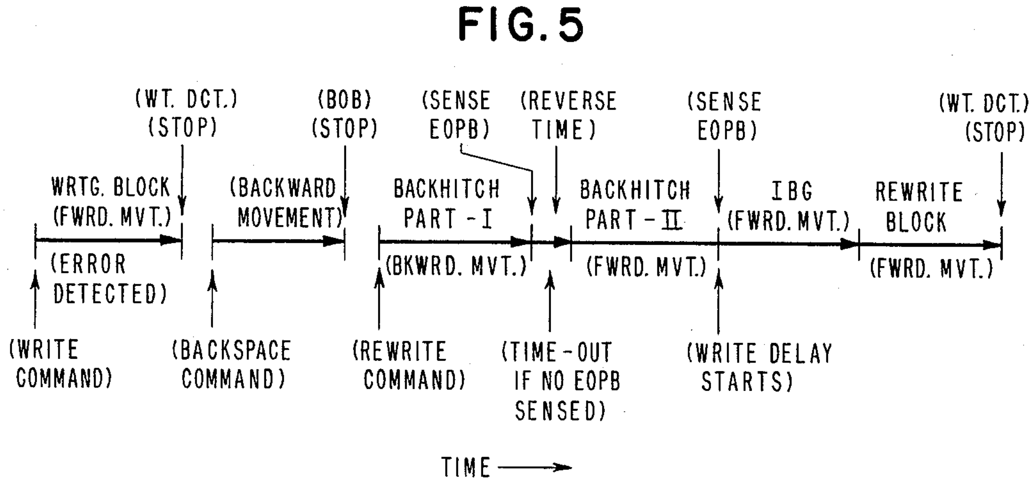
FIGURE 5 illustrates a functional timing diagram used in explaining the operation of the invention.

A situation in which this invention is applied is outlined in FIGURE 5, which illustrates a timing sequence for rewriting a block on tape which was found to have an error while read-monitoring its prior writing. Thus in FIGURE 5 (on the left), a "write command" is initially given resulting in forward movement (FWRD. MVT.) for the tape during which a block of data was written, but during which a recording error was detected by a read head gap following the write head gap. The error indication actuates a subroutine in the program for the system. The rewriting subroutine is well known in the art and has been used commercially for several years, without any backhitching operation of course. The subroutine however results in a "backspace command" which is given after a write disconnect (WT. DCT.) is signaled at the end of the block. The backspace command reverses the direction of movement for the tape. Before beginning the backward movement, the "write status" of the Tape Drive is discontinued, and it is put into "read status." Backward tape movement (BKWRD. MVT.) continues during which the beginning of the block (BOB) is sensed. The read head gap senses the beginning of a block (BOB) for example by sensing the termination of data bytes in the block. Sensing BOB ends the backspacing operating by terminating a tape GO signal, that would normally terminate the backward movement. (However, sensing the beginning or end of the block may not in fact stop backward movement of the tape if within a millisecond (for example) of terminating a tape GO signal, a new "command" brings up the tape GO signal before tape movement is effectively terminated.) However, under these circumstances after completion of the backspace command, a write command will find the tape unit in read status; and under this condition a backhitch (BKHITCH) operation results. The backhitching operation occurs in two parts: Part I continues the backward movement of the tape until the end of the prior block (EOPB) is sensed. The EOPB results in a tape reversal (usually obtained by first stopping the tape and then causing forward movement). Normally the stop and reverse movement starts when the read head is within the body of the prior block. If no prior block is sensed within a short period of time (such as 8 milliseconds) then the tape direction is automatically reversed. This might occur where the block being rewritten is the first block on a reel of tape, or where an extra long interblock gap (provided to include a tape defect) precedes the block being rewritten.

When the reversal in tape movement is signaled, Part II of the backhitch operation is started; and it continues until the end of the prior block (EOPB) is sensed in the forward direction, during which the tape velocity has reached normal speed. The backhitching operation is terminated at the sensing of the end of the prior block (EOPB), and the erase head (if any) is turned ON and a write delay (which holds up the actual writing of the block to generate the IBG) is started simultaneously. After the write delay terminates, the rewriting operation is started and the tape block is rewritten, ending with a write disconnect (WT. DCT.) signal.

Figures 6A, 6B, 6C, 6D, 6E, 6F, 6G, 6H:
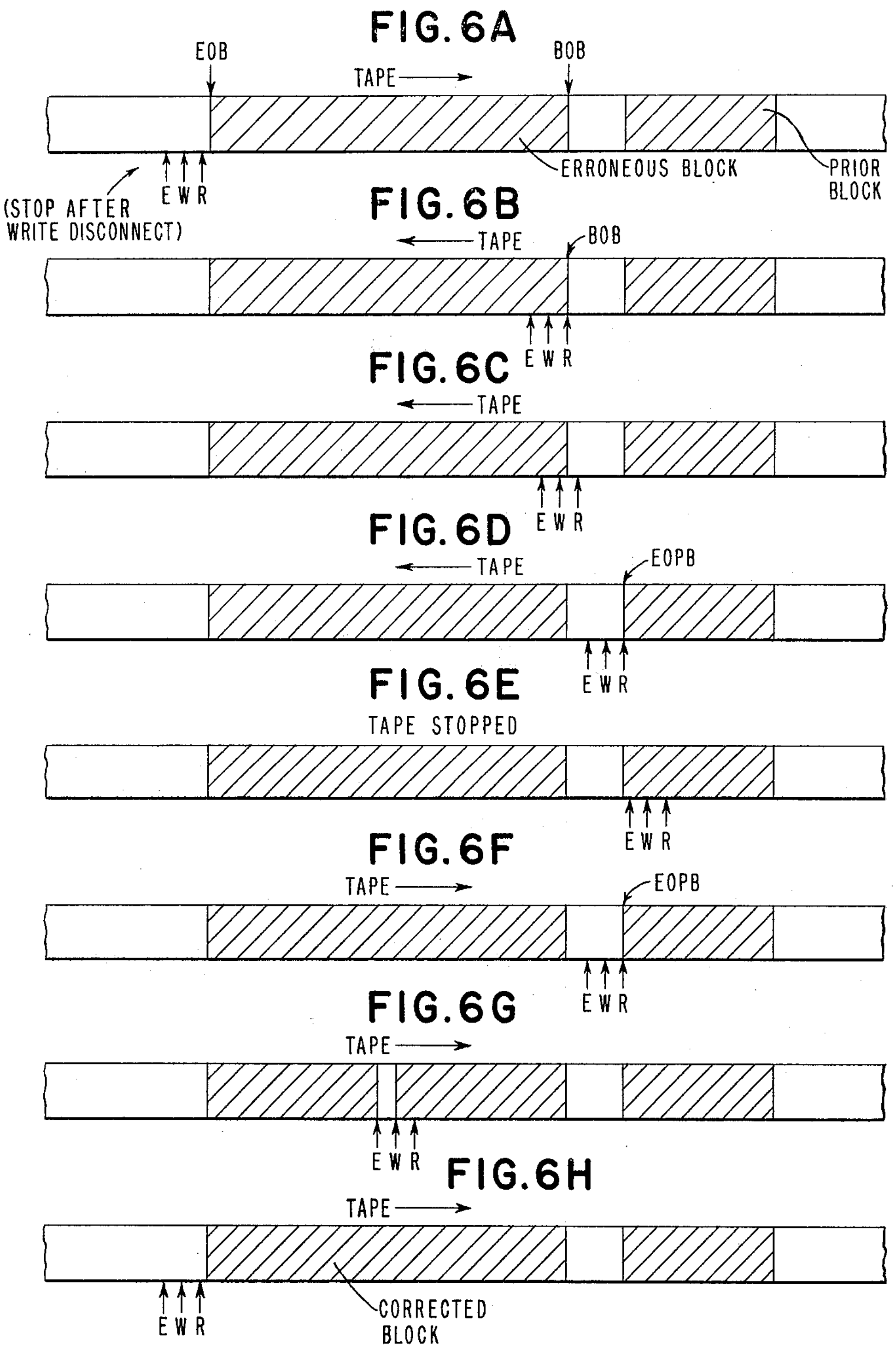

FIGURES 6A through 6H illustrate respective head positons relative to the tape as the sequence of events, described in connection with FIGURE 5, occurs. Thus in FIGURE 6A the tape is stopped after a data block has been written in a forward direction and an error sensed therein by the read-head gap. The write head moved in a forward direction beyond the end of the block before stopping occurred. Then a backspace command is given which causes the tape drive to be set to read status and results in backward tape movement as shown in FIGURE 6B, during which the read head senses the beginning of the block (BOB) from which a stop signal results. (Without this invention, the stop signal would bring the read head gap to a stop within the interblock gap preceding the erroneous block as shown in FIGURE 6C, with the write and erase head gaps within the erroneous block. A rewrite operation would then leave the initial part of the old block, which would be error causing data.)

The tape movement is not actually stopped but continues in a backward direction; because a backhitching operation is then automatically started by using this invention. When the write command is brought up while the tape drive is in read status, backhitch operation Part I automatically results, which continues the backward tape movement into the prior data block as shown in FIGURE 6D, during which the read head gap senses the end of the prior block (EOPB). The tape is then stopped and reversed with the head gaps within the prior block. FIGURE 6E illustrates the momentarily stopped condition of the tape between backhitch Parts I and II, wherein the read head is well within the body of the prior block. After the tape reverses to the forward direction, it is accelerated, and the read head again senses the end of the prior block (EOPB) as is shown in FIGURE 6F, at which the write delay is started and the erase head is turned ON. As forward movement continues, the write delay times out; and the erroneous block is being erased, and rewritten as shown in FIGURE 6G. When the rewritten block is complete, a write disconnect signal is given by the computer, and the tape stops after the read gap has completely traversed the rewritten block for error checking.

Figure 1:
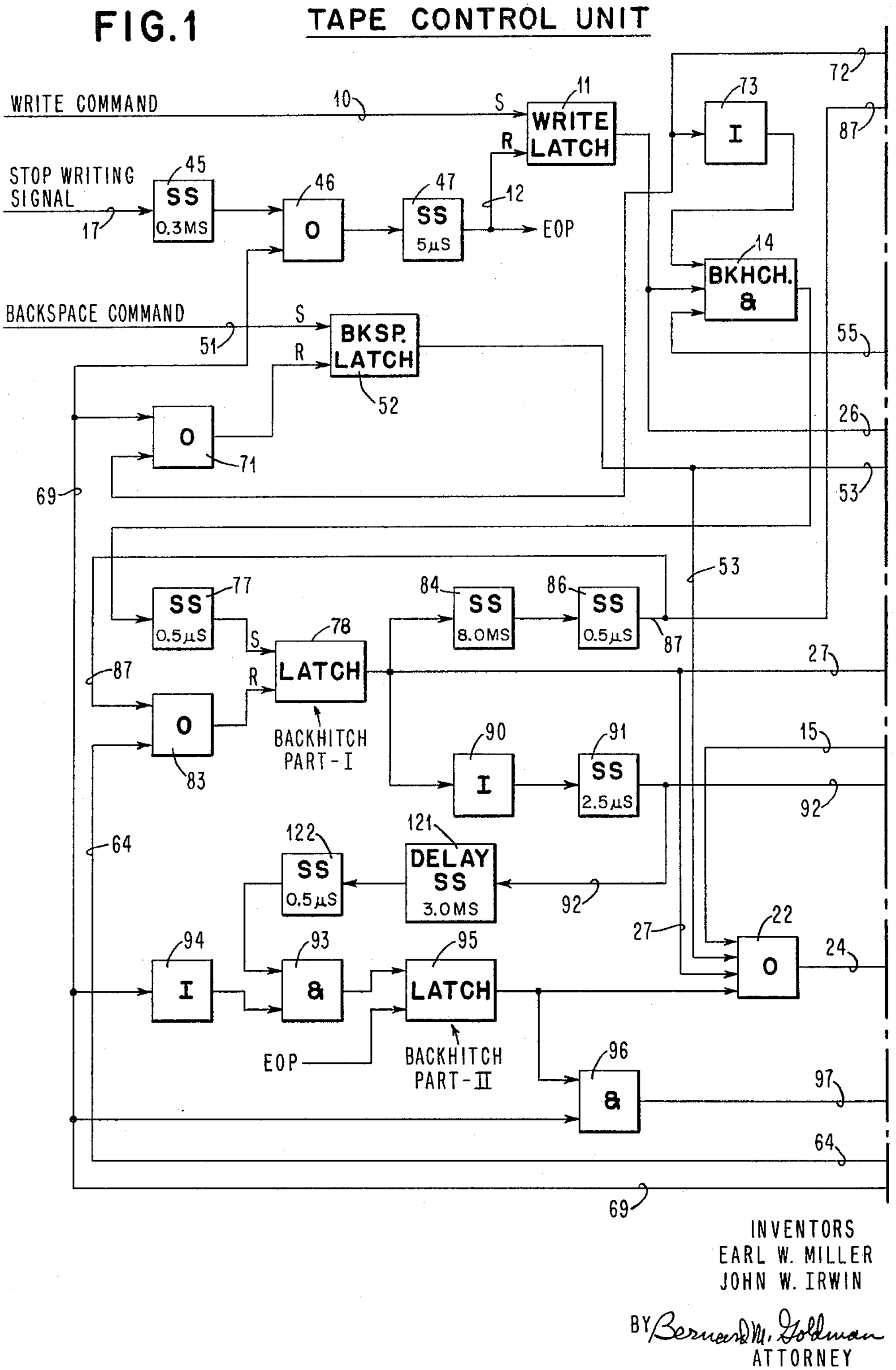
Figure 2:
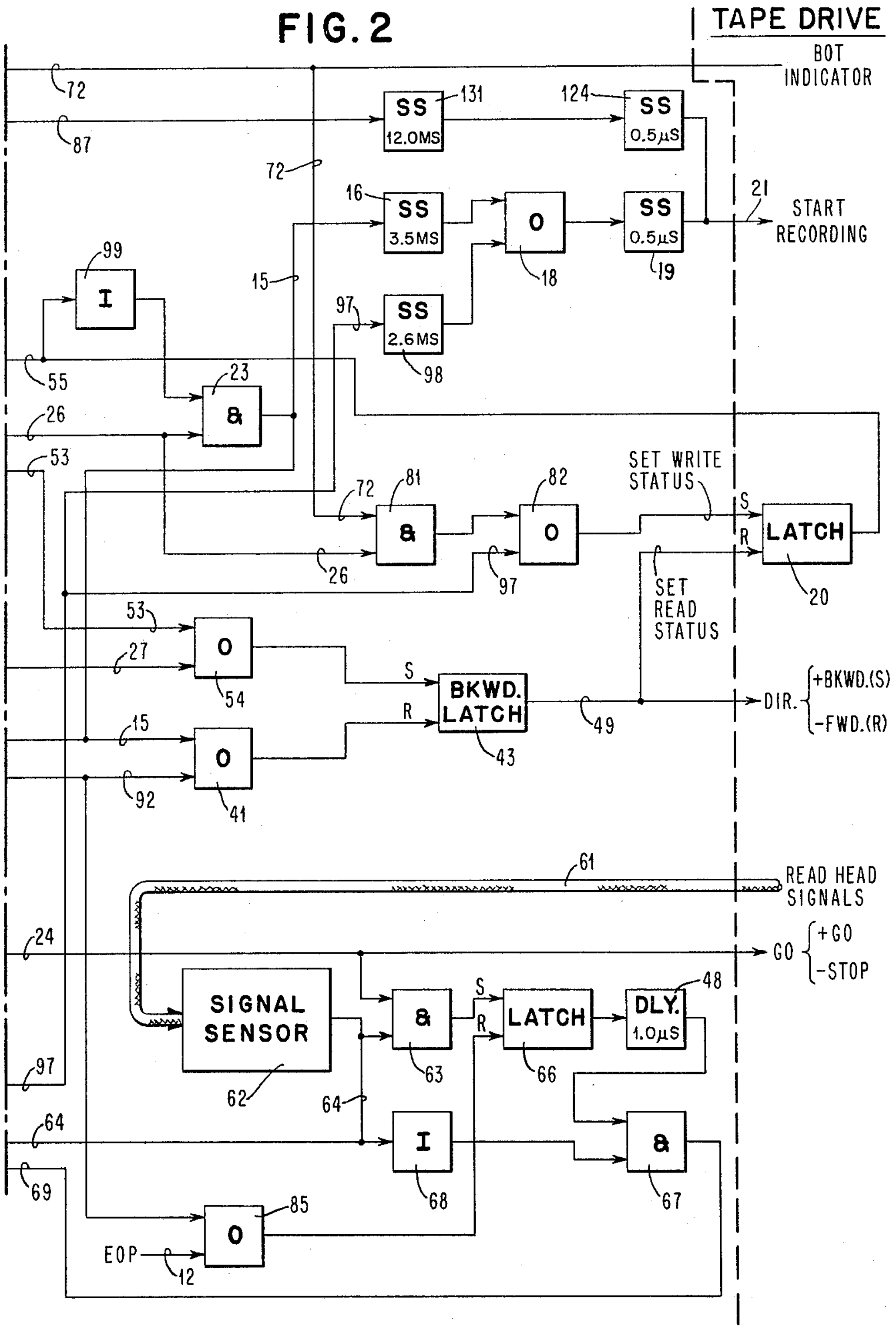

FIGURES 1 and 2 are taken together to provide an embodiment of this invention. They include the pertinent portions of a TAPE CONTROL UNIT and a TAPE DRIVE. The Tape Control Unit is connected to a computer (not shown) by lines 10, 17 and 51; and the Tape Drive is connected to the Tape Control Unit.

A write command is provided on input line 10 from the computer for initiating the writing of each data block on tape. A write command on lead 10 sets a write latch 11, which indicates write status for the Tape Control.

A "stop writing" signal is obtained on line 17 from the computer system at the end of the transfer of each block of data written on tape. The stop writing signal actuates a delay single-shot 45 which provides a delay (0.3 ms. for example) sufficient for housekeeping operations by the Tape Control and Tape Drive, such as maintaining forward tape movement until the read head gap has completed monitoring a newly written block, writing a final synchronization burst or a check character at the end of the data, etc. The trailing edge of a delay pulse from single shot 45 passes through an OR circuit 46 to actuate a pulse-forming single-shot 47, that provides an end of operations reset pulse (EOP), which resets latch 11 and other circuits in the Tape Control.

A backspace command from the computer system can be provided on an input line 51. It causes the tape to be moved backward and stopped with the read head in the interblock gap (IBG) preceding the data block over which the backspace occurred. A backspace command sets a backspace latch 52 which then provides an output on a lead 53 through an OR circuit 54 to set a backward latch 43 to backward status, which is provided as a voltage level on a lead 49.

The occurrence of a write command or a backspace command is a function of a program stored within the computer system. The occurrence of the stop write signal is provided generally by a storage mark or other means in the main memory of a computer system to define the end of a block data.

One or more Tape Drives can be connected to the Tape Control Unit. It is assumed herein that only a selected Tape Drive from such group is being controlled, and such selected Drive is represented in FIGURE 2. Each Tape Drive has a status latch 20. When set, latch 20 indicates that the Tape Drive (when selected) is in read status. The Tape Drive cannot write on tape when latch 20 is in read status. However, when in write status, reading is used to monitor a writing operation.

Leads 24 and 49 connect from the Tape Control to the Tape Drive to control the tape motion for the selected Tape Drive. When the voltage level on line 49 is down (minus), only tape motion in the forward direction is permitted; and when the voltage on lead 49 is up (positive), only tape motion in the backward direction is permitted.

The voltage on lead 24 controls whether the tape is being driven or whether a brake is applied to it. When the voltage is up on lead 24, the tape is driven (in the direction indicated by the voltage on lead 49). And when the voltage on lead 24 is brought down, a brake is applied to the tape which can stop it within a few milliseconds.

The read heads in the Tape Drive are connected to multiple lines in a read bus 61 which conveys read signals from all of the tracks to a signal sensor 62. Signal sensor 62 integrates and combines (by ORing) all received track signals to indicate when a tape data block is being read. Signal sensor 62 can be made of circuits well known in the art, such as for example integrators or timeout single-shot devices and an OR gate to provide a signal that is brought up when the read heads enter a data block and which stays up as long as data characters (or bytes) are being received from a block being read from tape. But sensor 62 times out when the end of a block is reached to signal the end of a block being read from tape.

The entering of a data block by the read head gaps is indicated when a particular output level from signal sensor 62 is provided on lead 64. Consequently, an "enter block" signal (a voltage-level rise) is provided on lead 64 to identify when the read heads have entered a block.

A "leave-block" signal is provided from an AND gate 67 on a lead 69 when the read gaps leave a block recorded on tape. This indication is obtained after the output of sensor 62 is processed through AND gate 63, latch 66, delay 48, inverter 68 and AND gate 67. AND gate 63 passes the set output from sensor 62 only when it also receives a GO signal from lead 24 (which indicates the tape is moving). Latch 66 is set by the rise in level of the signal sensor output when the read heads enter a block, so that the set output level of latch 66 is obtained after the read heads have entered a block. Also the output of sensor 62 is provided through an inverter 68, which provides a rise in output voltage when the read heads leave a block. The inverter output enables AND gate 67 when no signal is being sensed by sensor 62. AND gate 67 also is enabled by the set output of latch 66, slightly delayed through delay circuit 48. Thus AND gate 67 provides an output level rise whenever the read gaps leave a data block. However, this voltage level rise provided on lead 69 passes through OR circuit 46 to actuate single-shot 47, which provides an EOP pulse that passes through OR circuit 85 to reset latch 66, which ends of the leave-block voltage level after the 1 $\mu$s. delay by circuit 48. Thus a leave-block pulse results at the output of AND gate 67 whenever the read gaps leave a block, such as occurs when the read gaps reach the beginning of a block (BOB) when tape is moving in a backward direction, or reach the end of the prior block (EOPB) when tape is moving in a forward direction.

A beginning of tape (BOT) indication (indicated by the three holes shown in FIGURES 3 and 4, or other well known indicators) is provided from the Tape Drive on a lead 72 whenever the beginning of tape is sensed in the Tape Drive.

A backhitch AND gate 14 provides an output that determines when a backhitching operation should be performed. It determines that a backhitching operation should be started upon the occurrence of a "write command" when the Tape Drive is in "read status" and the tape is not at its BOT indicator. Thus gate 14 is inhibited by a BOT indication on lead 72, which is provided to an input gate 14 through an inverter 73 to prevent a backhitch operation from being performed if the heads are at the beginning of tape (BOT) mark.

A read-write status latch 20 in the selected Tape Drive provides a second input to backhitch gate 14 on a lead 55. A read status output of latch 20 provides an enabling input to gate 14, and thus a write status output by latch 20 inhibits gate 14. Any backspacing operation resets latch 20 to read status, since a backward signal on lead 49 results from a backspace command on lead 51 as explained above.

Gate 14 also receives an enabling input from write latch 11, after it is set by a write command. An output provided from AND gate 14 starts a backhitching operation by actuating a pulse-forming single-shot 77, which sets a latch 78 to begin backhitch Part I. When set, the output of latch 78 does two things: (1) it starts a backhitch Part I maximum boundary time, represented by an 8 millisecond delay single shot 84; and (2) it starts the backhitching operation by causing a signal through OR circuits 22 and 54 to bring up a tape GO signal on lead 24 and a backward direction signal on lead 49 (by setting backward latch 43).

Thus as the tape is moving backward in performing backhitch Part I, it has 8 milliseconds during which to find the end of a prior record. The boundary of the 8 millisecond period is determined by single shot 84 actuating a pulse-forming single shot 86 that provides a pulse on lead 87 that passes through OR circuit 83 to reset latch 78 and end backhitch Part I. The only time that the 8 millisecond boundary will expire before completion of a normal Part I operation is where there is no prior block (such as before the first block on a tape, or where the interblock gap (IBG) in which the backspace operation terminates is so large that the read head moves backward for 8 milliseconds without sensing any prior block). A large IBG can occur when the interblock gap is extended to include a tape defect as disclosed and claimed in a Patent No. 2,975,407 to Hugh O'Brien, titled "Erase Forward."

In most cases there will be a prior block which is sensed before expiration of the 8 millisecond boundary period. The sensing of the end of the prior block (EOPB) is indicated by the rise in voltage level on lead 64 which is brought up when the read heads enter the prior block (EOPB) with tape moving in the backward direction. The increase in voltage level on lead 64 at EOPB is provided through OR gate 83 to reset latch 78. When reset, the output of latch 78 drops to terminate backhitch Part I by dropping the GO signal on lead 24, resulting in a brake being applied in the Tape Drive to stop tape movement. Simultaneously with the reset of latch 78, the output of inverter 90 is brought up to actuate a pulse-forming single shot 91 which provides a pulse: (1) that passes through an OR circuit 41 to reset latch 43, which then provides a forward direction output on lead 49 to reverse the permitted direction of tape movement, and (2) that after a 3.0 millisecond delay actuates an AND gate 93 to set a backhitch Part II latch 95 to start backhitch Part II. A delay single shot 121 is actuated by single shot 91; and after the 3.0 millisecond delay, single shot 121 actuates a pulse-forming single shot 122 that provides a pulse through gate 93 to trigger latch 95. The 3.0 millisecond delay allows the tape movement in the backward direction to be brought to a stop. AND gate 93 has its other input enabled by the output of an inverter 94 while it is not receiving any pulse from AND gate 67. The setting of latch 95 provides an output through OR gate 22 which brings up the level on GO line 24 to start tape movement in the forward direction.

No output from latch 95 passes through AND gate 96 at this time because its other input from lead 69 is down at this time.

When the tape direction is reversed at the end of Part I, the read head gaps are within the body of the prior record; and this is where backhitch Part II normally starts. The amplitude of the signals read from tape falls and then rises during the tape direction reversal with the decrease, stopping and increase of tape velocity. An output pulse from gate 67 is inhibited during tape reversal from backward to forward direction by resetting latch 66 with the output of single shot 91 through OR circuit 85 at the end of backhitch Part I. Latch 66 cannot again be set until the backward tape movement stops, since gate 63 is inhibted by the absence of a tape GO signal while the tape is coming to a stop. Without the inhibition of the termination of input signal on bus 61 due to tape stoppage might appear similar to termination of input signal on bus 61 upon the read head leaving a block.

The rise of level on lead 64 with tape velocity increase after the tape movement reversal provides another reset pulse through OR circuit 83 to latch 78, but this does nothing since the latch was previously put in reset status to end backhitch Part I.

However, the voltage rise on lead 64 passes through gate 63, now enabled by a GO signal from latch 66, to set latch 66.

When the end of the prior block (EOPB) is reached by the read gaps with tape movement in the forward direction, a pulse is generated from the output of AND gate 67 in the manner explained above. To reiterate, the termination of the signal from sensor 62, after reaching the end of the block, brings up the output of inverter 68 to activate the output of AND gate 67, which then provides a pulse on lead 69. This EOPB indicating pulse passes through AND gate 96 (which has its other input enabled by latch 95) to simultaneously accomplish two purposes, which are: (1) to actuate a write-delay single shot 98 that prevents any writing operation by the Tape Drive during its delay period (for example, 2.6 milliseconds) during which an interblock gap is generated, and (2) to provide the EOPB indicating pulse through an OR circuit 82 to set the Tape Drive status latch 20 to write status which activates the write heads (without writing by them) and turns on the erase head (if any is used). The EOPB indicating pulse provided on lead 69 also terminates backhitch Part II by providing a signal through OR gate 46 to actuate pulse-forming single shot 47 that provides an EOP signal which resets latch 95 to terminate backhitch Part II. Latch 66 is also reset by the EOP pulse.

Since the tape has reached its normal forward speed by the time that the heads have reached the end of the prior block (EOPB), a relatively short write delay is needed in order to time out a precise interblock gap (IBG) after which the rewriting of the block starts. Thus the write delay used after a backhitch would generally be insufficient to accommodate the normal write delay where the tape is stopped and then started to write a succeeding block. In the latter case, a long write delay is needed because of the slower tape speed while it is being started. The long write delay is represented herein by a delay single shot 16 (providing a delay for example of 3.5 milliseconds). Single shot 16 is activated by the output of AND gate 23, which is inhibited during any backhitching operation by the read status of latch 20 provided to an input of AND gate 23 through an inverter 99. Thus gate 23 is enabled by latch 20 only when it is in write status, which exists when blocks are sequentially being written with a stop permitted between blocks. Hence throughout a backhitching operation, latch 20 is in read status which inhibits gate 23 and prevents the long write delay of single shot 16.

However, where no prior block was sensed by the end of the 8.0 millisecond boundary timeout of single shot 84, an extra-long write-delay single shot 131 is then activated to provide a 12 millisecond delay, which prevents writing until the tape has reversed and moved forward over the prior long interblock gap before starting to rewrite the block. A pulse forming single shot 124 is triggered at the end of the 12 millisecond delay to provide a start recording pulse on lead 21. This prevents writing in a place which was previously determined to be undesirable for recording a block.

Expiration of any of the three write delays of 2.6 or 3.5 or 12.0 milliseconds provided on OR circuit 18 activates a pulse-forming single shot 19 which provides a signal which causes recording to start. Where both the 12 and 2.6 millisecond delays are activated, the 2.6 terminates first to actuate single shot 19 and start recording.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A system for backhitching a digital tape data block recorded on a tape in a tape drive comprising:

means for sensing the occurrence of a write command while said tape drive is in read status to provide a backhitch signal, means for driving said tape in a backward direction in response to said backhitch signal, and means for reversing the direction of movement of said tape in response to sensing an end of a prior block.

2. A system as defined in claim 1 including, means for activating a write delay upon resensing the end of said prior block while moving said tape in a forward direction.

3. A backhitching system defined in claim 1 in which a boundary-time delay is actuated in response to said backhitch signal, and said reversing means is actuated by expiration of said boundary-time delay if before its expiration no sensing has occurred of an end of a prior block during tape movement in the backward direction.

4. Means for backhitching a tape recorded with digital data comprising:

means for sensing the existence of read status for a tape drive when a write command is given to provide a backhitch initiating output, means for moving said tape in a backward direction and reversing to a forward direction, and means for activating a write delay after said reversing.

5. Means for backhitching a tape in a tape transport with said tape having gaps between data blocks recorded thereon comprising:

means for sensing a read status for said tape drive when a write command is received, and means for actuating said tape transport to drive said tape in a backward direction and then in a forward direction before activating a write delay.

6. A digital tape drive having for each track on magnetic tape separate read, write and erase head gaps with large spacings among them in relation to the size of an interblock gap between blocks recorded on said digital tape comprising:

means for sensing the occurrence of a write command while said tape drive is in read status to provide a backhitch signal, means for driving said tape in a backward direction and then in a forward direction in response to said backhitching signal.

and means for activating a write delay while said tape is being driven in said forward direction.

7. A backhitching means as defined in claim 6 including, means for activating said erase head gap in said tape drive simultaneously with activation of said write delay.

8. Backhitching means as defined in claim 6 further including timeout-boundary defining means activated in response to said backhitching signal, and means for reversing said tape movement in response to the expiration of said boundary-time means without the sensing of any end of a prior block.

9. A backhitching system for a digital tape having its movement controlled in a tape drive, comprising:

drive status bistable means in said tape drive for storing the read or write status of said tape drive, a write bistable means being set by a write command, a back hitch AND gate receiving outputs of said write bistable means and said drive status bistable means to provide an output when said write command is received during read status of said tape drive.

a first backhitch bistable means being activated in response to an output of said backhitch AND gate, means for driving said tape in a backward direction in response to an activated output of said first backhitch bisable means, means for sensing the end of a prior block written on tape during said backward tape direction, means for resetting said first backhitch bistable means in response to said sensing of an end of said prior block, a second backhitch bistable means being set upon the sensing of said end of said prior block to activate forward motion for said tape, and write delay means being activated upon a resensing of said end of said prior block during forward tape motion.

10. A backhitching means as defined in claim 9 including, timeout-boundary defining means activated in response to an output of said backhitching AND gate, and means for reversing said tape movement to the forward direction upon the timing out of said boundary defining means without the sensing of the end of said prior block.

11. Backhitching means for a tape system comprising:

means for backspacing a tape in response to an error indication while writing a block of data, means for placing a selected tape drive into read status in response to said backspace means, means for terminating a backspace operation upon the beginning of said written block being sensed during backward tape movement, means for providing a write command for rewriting said record, means for sensing the existence of said read status for said tape drive when the write command is received to provide a backhitch initiating signal, means responding to said backhitch signal to continue backward movement of said tape, means for sensing the end of a prior block during said backward movement, means for reversing movement of said tape upon sensing the end of said prior block, and means for activating a write delay upon sensing said end of said prior block with tape movement in a forward direction.

12. A system for controlling the movement of tape to prevent the effect of a shift in effective head gap position due to a switching of system operation from one head gap to another in the same tape track, comprising first means for sensing an operation status assigned to one of said head gaps, second means for sensing an operation status assigned to the other of said head gaps, means for signalling a shift in operation from said first means to said second means, tape drive means responding to said signalling means to drive said tape in an opposite direction to a direction for said head gap shift, means for reversing the movement by said tape drive system after a period of movement in said opposite direction, and means for effecting said shift in head operation after reversing movement.

References Cited by the Examiner

UNITED STATES PATENTS

| | | | |
|---|---|---|---|
| 2,975,407 | 3/1961 | O'Brien | 340—174.1 |
| 3,136,465 | 6/1964 | Comstock | 179—100.2 |

BERNARD KONICK, *Primary Examiner.*

A. F. BERNARD, JAMES W. MOFFITT, *Examiners.*